United States Patent
De Haas

(10) Patent No.: US 7,382,597 B2
(45) Date of Patent: Jun. 3, 2008

(54) METHOD AND APPARATUS FOR A BONDWIRE DECOUPLING FILTER FOR AN INTEGRATED VOLTAGE REGULATOR AND TRANSCEIVER

(75) Inventor: Clemens G. J. De Haas, Malden (NL)

(73) Assignee: NXP B.V., Eindhoven (NL)

( * ) Notice: Subject to any disclaimer, the term of this patent is extended or adjusted under 35 U.S.C. 154(b) by 483 days.

(21) Appl. No.: 10/547,728

(22) PCT Filed: Mar. 2, 2004

(86) PCT No.: PCT/IB2004/000588

§ 371 (c)(1),
(2), (4) Date: Sep. 2, 2005

(87) PCT Pub. No.: WO2004/079933

PCT Pub. Date: Sep. 16, 2004

(65) Prior Publication Data

US 2006/0158815 A1    Jul. 20, 2006

Related U.S. Application Data

(60) Provisional application No. 60/479,233, filed on Jun. 17, 2003, provisional application No. 60/453,049, filed on Mar. 7, 2003.

(51) Int. Cl.
*H02H 9/00* (2006.01)

(52) U.S. Cl. .................................... 361/119

(58) Field of Classification Search ............... 361/118, 361/119
See application file for complete search history.

(56) References Cited

U.S. PATENT DOCUMENTS

| | | | | |
|---|---|---|---|---|
| 4,823,095 A | * | 4/1989 | Atallah et al. | 333/22 R |
| 5,528,630 A | * | 6/1996 | Ashley et al. | 375/258 |
| 6,414,538 B1 | * | 7/2002 | Bosnyak et al. | 327/540 |
| 6,911,739 B1 | * | 6/2005 | Jin et al. | 257/784 |
| 7,020,277 B1 | * | 3/2006 | Lee et al. | 379/405 |
| 2001/0020871 A1 | | 9/2001 | Titus | |

* cited by examiner

*Primary Examiner*—Stephen W Jackson
(74) *Attorney, Agent, or Firm*—Peter Zawilski

(57) ABSTRACT

A bondwire decoupling filter 300 for filtering RF noise from a transceiver bus 330 of a transceiver 303 connected a device 302 to be protected from RF noise. The filter includes an external capacitor 315 adapted to receive an output from a device 302 to be protected from the RF noise; a first pair of bondwires 305, 307 each having respective first and second ends, and the first pair of bondwires is connected to the external capacitor 315 at respective first ends. A first bondwire 307 of the first pair of bondwires 305, 307 is connected to an output of a voltage regulator 302, and a second bondwire 305 of said first pair of bondwires being connected to the transceiver bus 330 at respective second ends. A second pair of bondwires 310, 312 each having respective first and second ends, are connected to a ground at respective first ends, and connected respectively to a voltage regulator 302 and a transceiver bus 330 at respective second ends.

20 Claims, 4 Drawing Sheets

METHOD AND APPARATUS FOR A BONDWIRE DECOUPLING FILTER FOR AN INTEGRATED VOLTAGE REGULATOR AND TRANSCEIVER

CROSS REFERENCE TO RELATED APPLICATIONS

This application claims the benefit of U.S. provisional application Ser. No. 60/453,049 filed Mar. 7, 2003 and U.S. provisional application Ser. No. 60/479,233 filed Jun. 17, 2003 both of which are incorporated herein by reference.

The present invention relates to the integration of functions in an electronic control unit. More particularly, the present invention relates to the filtering of noise in integrated products, which are vulnerable from an insufficient Electro Magnetic Immunity (EMI) to perform in an integrated setting, with nearly the same results as in isolation.

There is a continuing trend in the art to integrate more functions present in an electronic control unit (ECU) used in applications such as automotive. One example is that of a voltage regulator and a Controller Area Network (CAN) transceiver that are combined in one integrated circuit. The CAN includes a bus in which many electronic items are connected. The Electro Magnetic Immunity performance of a product used in an automotive-type setting is an important parameter, as isolation of each product is cumbersome and more expensive to manufacture.

For example, in the case of an ECU that is connected to a wiring harness having a bus with long wires running through a car, the wires can act as antenna for high frequencies, introducing noise problems. Accordingly, special care needs to be taken (use of special transceivers and a good PCB design, for example) to prevent this high frequency noise from affecting operation of the ECU.

FIG. 1 shows an example of a prior art attempt to reduce the noise to different components of the ECU. Namely, there are three integrated circuits shown in FIG. 1, the voltage regulator 102, the CAN transceiver 110 and the microcontroller 104. In actual practice, there would be far more than three integrated circuits, but only three are presented here so as not to obscure the meaning of the drawing.

Capacitor C1 115 is necessary to decouple the 5 volt supply. In addition, the capacitor is effective against RF disturbance present on the CAN bus, and is coupled through the output stage of the CAN transceiver on the output of the voltage regulator. As the voltage feedback is used in a typical voltage regulator, the RF current would disturb its output, but C1 115 directs this RF current into the ground without disturbing the 5 volt supply.

FIG. 2 shows another prior art attempt at integration and overcoming the noise problems. In this Figure, the voltage regulator 202 and the CAN transceiver 208 are combined on one monolithic integrated circuit. Also included in this schematic diagram are bondwires 205 and 206, shown as inductors typically having an inductance of 1 mh. Similar to FIG. 1, a typical integrated voltage regulator and transceiver would have more functions integrated on this one IC.

The transceiver 208 is connected internally to the output of the voltage regulator. At low RF frequencies ($I_{LF}$) the decoupling is the same as in FIG. 1. However, at high frequencies the decoupling capacitor C1 215 is not effective because of the bondwire inductance L1 207 in the 5 v supply path and L2 210 in the ground. The voltage regulator will be under influence of the RF current above a certain frequency ($I_{HF}$), thereby disturbing the 5V supply.

The present invention provides an apparatus and method for providing a bondwire decoupling filter that ensures that an internal supply and internal ground is free of any RF disturbance present on the CAN BUS. The invention includes the addition of extra bondwires to both the output of the voltage regulator, and the output of the transceiver, as well as connecting them to inputs and outputs of the CAN BUS, to filter the RF disturbance so it does not affect the voltage regulator. Otherwise, the output of the voltage regulator could become wavy and its range could vary such to adversely affect operation of the integrated circuit in which the voltage regulator and CAN transceiver are arranged on.

The above and other features and advantages of the present invention will become more apparent from the following detailed description when taken in conjunction with the accompanying drawings, in which.

In the following descriptions, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. Moreover, for the purpose of clarity, detailed descriptions of well-known devices, circuits, and methods are omitted so as not to obscure the description of the present invention with unnecessary detail. It is to be understood that there typically would be other devices on the integrated circuit, and that the devices generating noise and being filtered so as to protect from noise are not limited to voltage regulator and CAN transceivers.

The CAN bus is a differential bus, having a high side CANH and a low side CANL switch. During transmission both switches should be switching as symmetrically as possible to minimize the common signal, thus minimizing the emission. It should be noted that the emission of the transmitter is much lower compared to RF signals that the transceiver is subjected to during the immunity tests and in an application. In other words, the main RF noise source is the noise that is picked up on the CAN bus, and not from the transceiver's own transmission.

Figure 1:
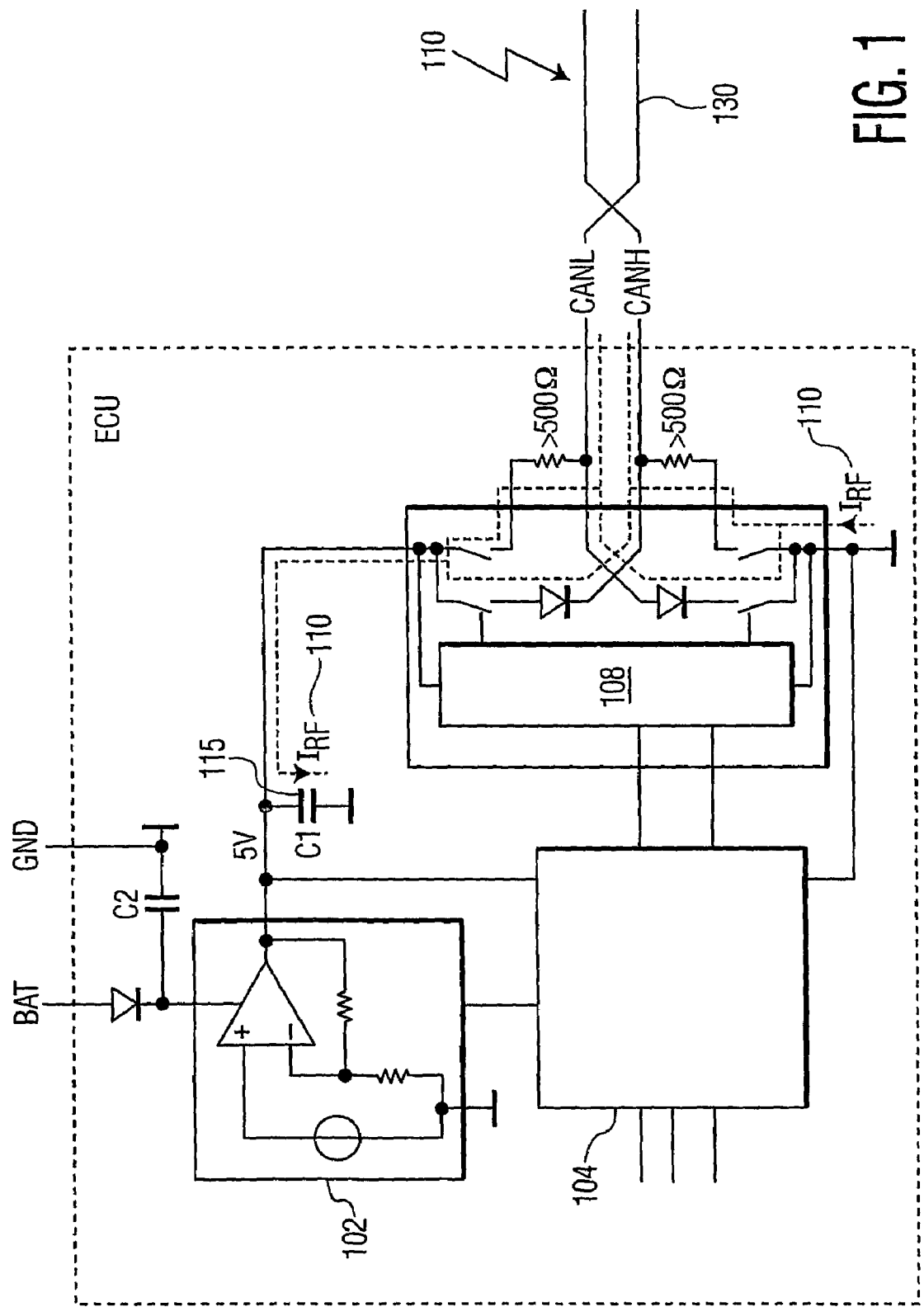
FIG. 1 illustrates a prior art electronic control unit having a voltage regulator, a controller, and a CAN transceiver separately arranged.
Figure 2:
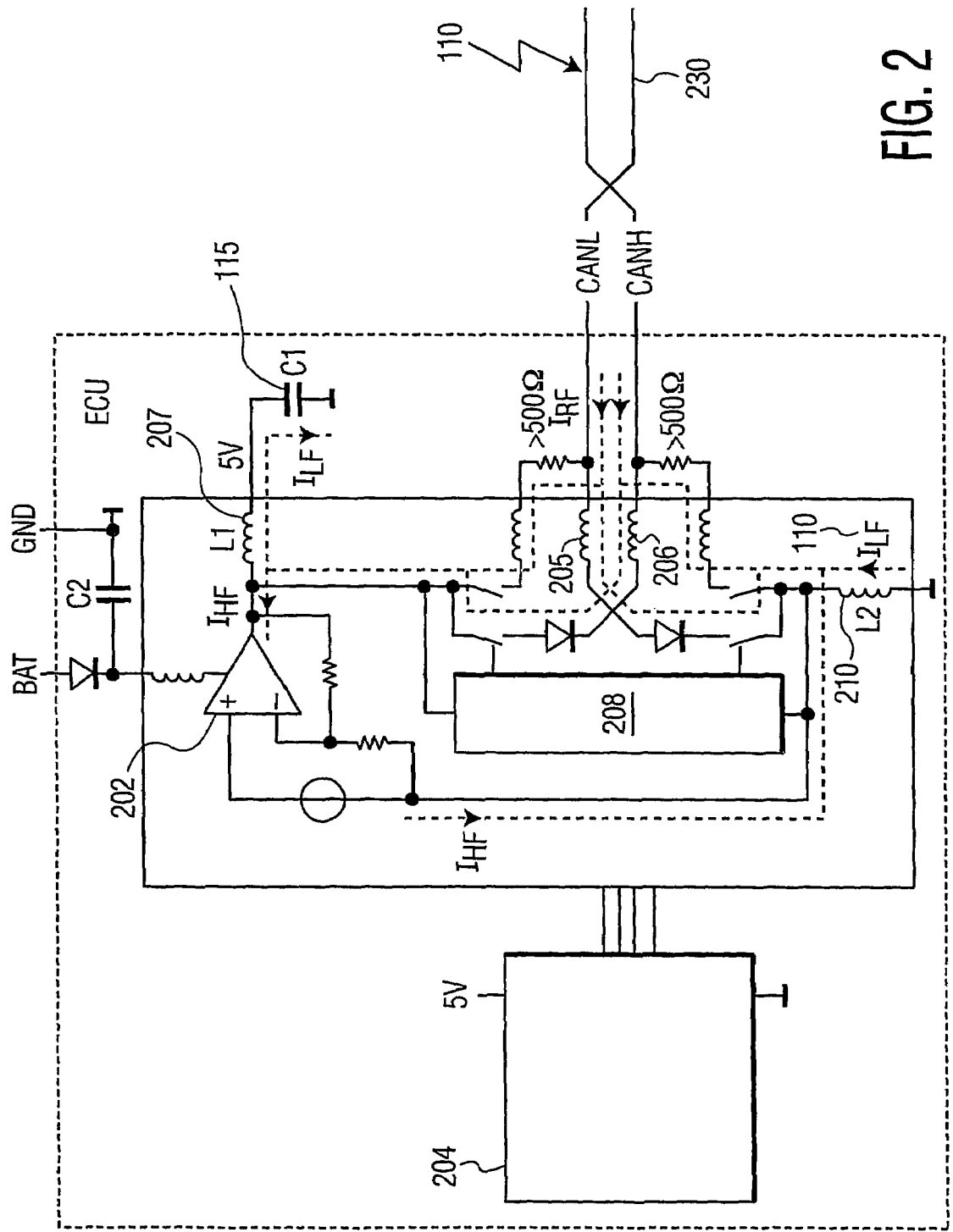
FIG. 2 illustrates a prior art electronic control unit having the voltage regulator and CAN transceiver integrated on a monolithic circuit.
Figure 3:
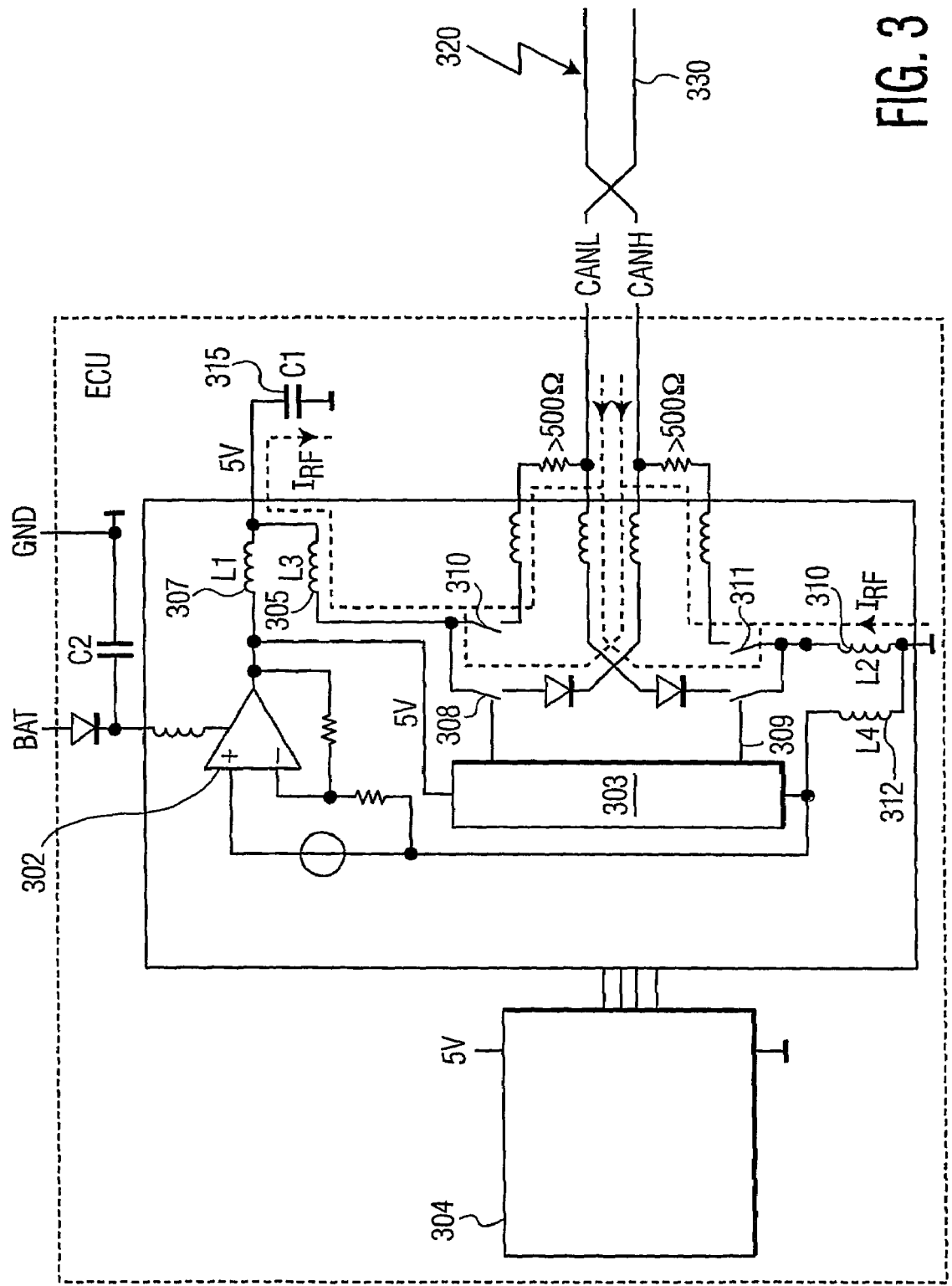
FIG. 3 illustrates a decoupling filter according to the present invention using extra bondwires coupled to existing bondwires and the external capacitor.

FIG. 3 shows a voltage regulator 302 and a CAN transceiver 303 arranged according to a first aspect of the present invention. In communication with the voltage regulator and CAN transceiver is microcontroller 304.

An external capacitor 315 is adapted to receive an output from a regulator 302 to protect the output from RF noise. The capacitor is particularly useful in eliminating certain predetermined high frequencies.

A first pair of bondwires 305, 307 each having respective first and second ends, both of which are connected to said external capacitor 315 at respective first ends, and a first bondwire 307 of the first pair of bondwires 305, 307 is connected to the output of the voltage regulator 302 and an input of a transceiver 303. The second bondwire 305 of the first pair of bondwires is connected to one of an output 308 of transceiver 303, and a transceiver bus 330 at respective second ends.

A second pair of bondwires 310,312 each having respective first and second ends, both of which are connected to a ground at respective first ends, and a first bondwire 310 of the second pair of bondwires 310,312 is connected to one of an output 309 of transceiver 303, and a transceiver bus 330 at respective seconds ends. The second bondwire 312 of the second pair of bondwires is connected to the ground reference of voltage regulator 302 and an input of a transceiver 303.

The first pair of bondwires 305, 307 and said second pair of bondwires 310, 312 all have a predetermined amount of inductance, typically around 1 nH, but this value may be changed according to need.

As can be shown in FIG. 3, RF disturbance from the can BUS 330 (shown by dashed lines I RF) can flow up through bondwire 305 and then to capacitor 315 without affecting the internal input to the CAN transceiver. Noise current I RF also flows from the CAN BUS 330 down to the bondwires 310 down to ground.

FIG. 3 also shows switches 310, 311 that are present in series with bus termination resistors that approximately greater than 500 ohms. These switches are static switches that are normally closed during operation. Only in case of a short on the bus to ground or supply will these switches open to prevent a DC current that would drain the battery of the car.

To reiterate, in this particular application, the RF current path flows through bondwire 305, capacitor 315 and bondwire 310. Bondwires 305,307,310,312 and capacitor 315 form a decoupling filter for the integrated voltage regulator 302 that ensures that the internal 5 v supply and internal ground is free of RF disturbance present on the CAN bus.

Figure 4:
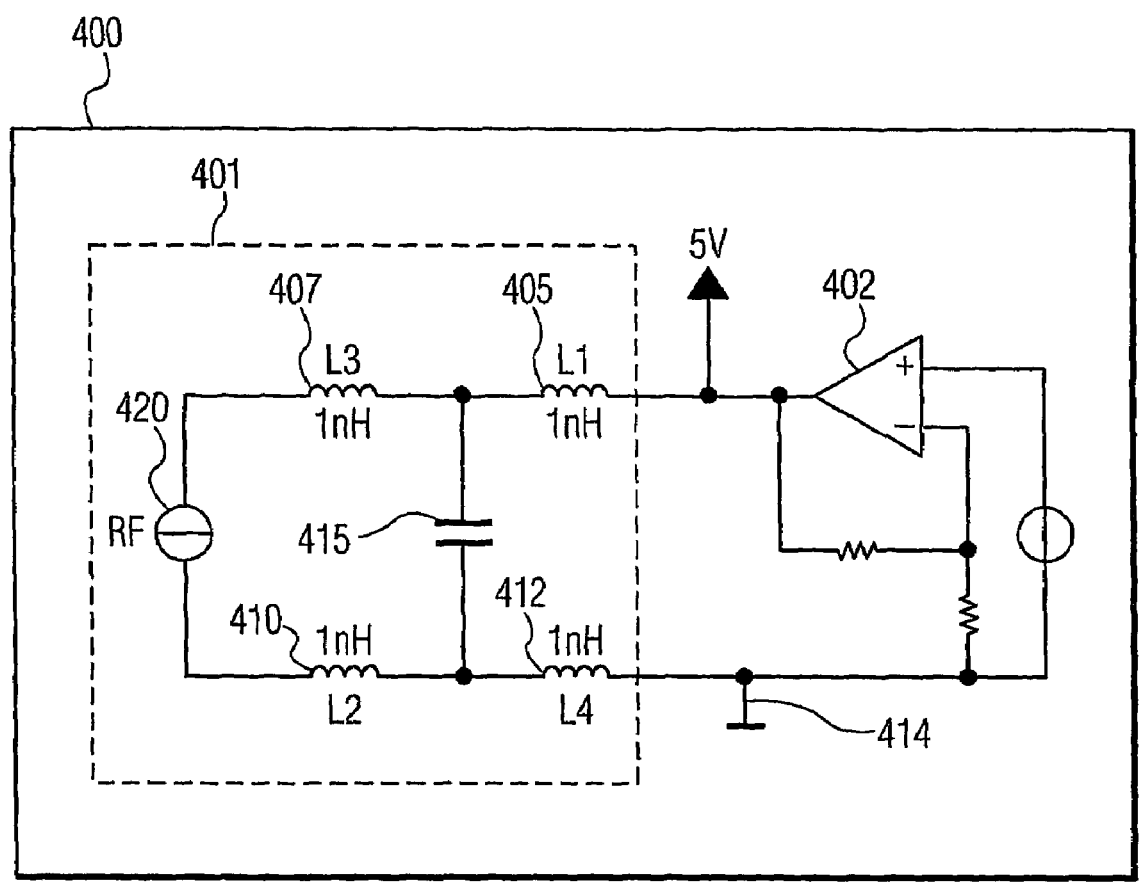
FIG. 4 illustrates a particular aspect of the bondwire decoupling filter according to the present invention.

FIG. 4 shows an aspect of an integrated voltage regulator and bondwire filter 400 according to the present invention. The bondwire filter 401 includes a first pair of conductors 405, 407 adapted at a first end for connection to an output of a voltage regulator 402 to be protected from RF noise. Preferably, the voltage regulator and bondwire filter are internally connected in a monolithic circuit.

The second pair of conductors 410, 412 are adapted at a first end for connection to a ground to the device is also connected, and a capacitor 415 having a predetermined value of capacitance is connected across the first and second pair of conductors so that a first end of the capacitor 415 is connected at a node between the first pair of conductors 405, 407 and the second end of the capacitor 415 is connected at a node between the second pair of conductors 410,412. Both the first pair of conductors and second pair of conductors are adapted at a second end to be connected to an RF generating device 330, namely CAN BUS 330.

It should be noted that while wherein both the first pair of conductors 405, 407 and the second pair of conductors 410,412 have a predetermined value of inductance (1 nH) this value can be changed according to need).

A method for the instant invention involves arranging a decoupling filter as disclosed preferably onto an integrated circuit, such as a monolithic circuit for automobiles.

Applicant notes that are there are various modifications that lie within the spirit of the invention and the scope of the appended claims. While the device shown in the above examples that needs to be protected from RF noise is typically a voltage regulator, the invention is not limited to the decoupling filter only filtering noise received/generated from a voltage regulator, and it could be another electronic device. The same issue is true with regard to the CAN transceiver and CAN BUS, while these are typical items that could receive RF noise, they are not the only devices affected by such noise, permitting the decoupling filter to be used with other devices. Nor are the values of the voltage regulator required to be in the vicinity of 5 volts, nor must the inductance of the bondwires be limited to 1 nH, or the capacitor value of 100 nf, as these values can be varied according to need.

The invention claimed is:

1. A bondwire decoupling filter 300 for filtering RF noise received by a transceiver bus 330 of a transceiver 303 connected to a device 302 to be protected from RF noise, said filter comprising:
    an external capacitor 315 being adapted to receive an output from a voltage regulator device 302 to be protected from said RF noise;
    a first pair of bondwires 305, 307 each having a respective first and second end, both of said first pair of bondwires being connected to said external capacitor 315 at respective first ends, and a first bondwire 307 of the first pair of bondwires 305, 307 is connected to the output of the voltage regulator 302 and an input of a transceiver 303 at said respective second end;
    a second bondwire 305 of the first pair of bondwires 305,307 being connected to one of an output 308 of transceiver 303, and a transceiver bus 330 at said respective second end;
    a second pair of bondwires 310,312 each having a respective first and second end, both of which are connected to a ground at respective first ends, and a first bondwire 310 of the second pair of bondwires 310,312 is connected to one of an output 309 of transceiver 303, and a transceiver bus 330 at said respective second end;
    a second bondwire 312 of the second pair of bondwires is connected to the ground reference of voltage regulator 302 and an input of a transceiver 303 at said respective second end;
    wherein of said first pair of bondwires and said second pair of bondwires all have a predetermined amount of inductance, and a flow of RF noise travels from first bondwire 305 of the first pair of bondwires, to capacitor 315 and to first bondwire 310 of the second pair of bondwires.

2. The apparatus according to claim 1, wherein the predetermined inductance of each bondwire of the first and second pairs of bondwires is about 1 nH.

3. The apparatus according to claim 1 wherein the transceiver comprises a Controller Area Network (CAN) transceiver 303, and said CAN transceiver and the voltage regulator device to protect from RF noise 302 are internally connected in a monolithic circuit.

4. The apparatus according to claim 3, further comprising a microcontroller 304 connected to at least the CAN transceiver 303 and the voltage regulator device to be protected from RF noise 302.

5. The apparatus according to claim 3, wherein said ground connected to the transceiver 330 comprises an internal ground.

6. An electronic control unit 301 having a bondwire decoupling filter, said electronic control unit comprising:
    (a) an integrated circuit comprising a voltage regulator 302;
    a controller area network (CAN) transceiver 303, wherein said CAN transceiver being adapted for receiving and sending of data via a CAN BUS 330, said voltage regulator and said CAN transceiver being connected internally in said integrated circuit;

an electronic microcontroller 304 electrically connected to both of said voltage regulator and said CAN transceiver; and (b) a bondwire decoupling filter 300 comprising:

an external capacitor 315 being connected to an output of said voltage regulator 302;

a first pair of bondwires 305, 307 connected to an output of said voltage regulator 302 and an input of said CAN transceiver;

a second pair of bondwires 310,312, connected between a ground and an output of the CAN transceiver;

wherein each of said first pair of bondwires and said second pair of bondwires is adapted for connection to said CAN BUS;

wherein each of said first pair of bondwires and said second pair of bondwires all have a predetermined amount of inductance.

7. The apparatus according to claim 6, wherein the predetermined inductance of each bondwire of the first and second pairs of bondwires is about 1 nH.

8. The apparatus according to claim 6, wherein the voltage regulator 302 outputs about 5 volts d.c.

9. The apparatus according to claim 6, wherein an input stage 308 of the CAN transceiver is connected to both the CAN BUS 330 and to the first pair of bondwires 305, 307.

10. The apparatus according to claim 6, wherein an output stage 309 of the CAN transceiver is connected to both the CAN BUS 330 and to the second pair of bondwires 310, 312.

11. An integrated bondwire filter 401 and voltage regulating device 402, comprising:

a first pair of conductors 405, 407 adapted at a first end for connection to an output of a device 402 to be protected from RF noise;

a second pair of conductors 410, 412 adapted at a first end for connection to a ground 414 to which said device 402 is also connected; and a capacitor 415 having a predetermined value of capacitance being connected across said first and second pair of conductors so that a first end of the capacitor 415 is connected at a node between the first pair of conductors 405, 407 and a second end of the capacitor 415 is connected at a node between the second pair of conductors 410,412;

wherein both the first pair of conductors 405, 407 and the second pair of conductors 410,412 have a predetermined of value inductance; and wherein both the first pair of conductors 405,407 and second pair of conductors 410, 412 are adapted at a second end to be connected to an RF generating device 303.

12. The bondwire filter according to claim 11, wherein the RF generating device comprises a Controller Area Network (CAN) 303 communicating with a CAN bus 330 that generates/receives RF noise 320.

13. The bondwire filter according to claim 12, wherein bondwire filter 401 and voltage regulator 402 are internally connected in a monolithic circuit.

14. The bondwire filter according to claim 11, wherein the CAN transceiver 303, voltage regulator 402, and the bondwire filter 401 are all arranged on an integrated circuit.

15. The bondwire filter according to claim 11, wherein the predetermined amount of inductance for each of the bondwires comprises 1 nH, and the capacitance of the capacitor comprises 100 nf.

16. The bondwire filter according to claim 14, wherein a microcontroller 304 is arranged on the integrated circuit, and controls functions an automobile via the transceiver transmitting/receiving along the CAN BUS.

17. A method for providing a bondwire decoupling filter comprising the steps of:

(a) providing an integrated circuit comprising a voltage regulator 302, a controller area network (CAN) transceiver 303 being internally connected to the voltage regulator, wherein said CAN transceiver is adapted for receipt/transmission of data via a CAN BUS 330;

(b) arranging an electronic microcontroller 304 in communication with both of said voltage regulator 302 and said CAN transceiver 303;

(c) arranging a bondwire decoupling filter 300 to:

(i) an output of the voltage regulator 302, (ii) an input and output of the CAN transceiver 303, and (iii) the CAN BUS 330 and a ground, so that an RF noise generated/received on said CAN BUS 330 is decoupled from said voltage regulator 302.

18. The method according to claim 17, wherein the arranging of the bondwire decoupling filter includes:

arranging an external capacitor 315 that is connected to an output of said voltage regulator 302;

arranging a first pair of bondwires 305, 307 connected to an output of said voltage regulator 302 and an input of said CAN transceiver; and arranging a second pair of bondwires 310,312 that is connected between a ground and an output of the CAN transceiver;

wherein each of said first pair of bondwires and said second pair of bondwires is adapted for connection to said CAN BUS;

wherein each of said first pair of bondwires and said second pair of bondwires all have a predetermined amount of inductance.

19. The method according to claim 18, wherein the predetermined inductance of each bondwire of the first and second pairs of bondwires is 1 nH and the external capacitor has a capacitor of approximately 100 nf.

20. The method according to claim 17, wherein the microcontroller 304 comprises a controller for an automobile that communicates via the transceiver along the CAN BUS.

* * * * *